US010554822B1

(12) United States Patent
Simhi et al.

(10) Patent No.: US 10,554,822 B1
(45) Date of Patent: Feb. 4, 2020

(54) NOISE REMOVAL IN CALL CENTERS

(71) Applicant: SoliCall Ltd., Tel-Mond (IL)

(72) Inventors: Shaul Simhi, Tel-Mond (IL); Ronit Rosi Simhi, Kfar-Yona (IL)

(73) Assignee: SoliCall Ltd., Tel-Mond (IL)

( * ) Notice: Subject to any disclaimer, the term of this patent is extended or adjusted under 35 U.S.C. 154(b) by 139 days.

(21) Appl. No.: 15/786,722

(22) Filed: Oct. 18, 2017

Related U.S. Application Data

(60) Provisional application No. 62/464,395, filed on Feb. 28, 2017.

(51) Int. Cl.
| | | |
|---|---|---|
| *H04M 9/08* | (2006.01) | |
| *H04N 21/233* | (2011.01) | |
| *G10L 21/0208* | (2013.01) | |
| *H04R 3/00* | (2006.01) | |

(52) U.S. Cl.
CPC ........... *H04M 9/08* (2013.01); *G10L 21/0208* (2013.01); *H04N 21/233* (2013.01); *H04R 3/005* (2013.01)

(58) Field of Classification Search
CPC ........ H04M 9/082; H04M 3/568; H04M 9/08; G10L 21/0208; H04N 21/233; H04R 3/005
See application file for complete search history.

(56) References Cited

U.S. PATENT DOCUMENTS

| | | | | |
|---|---|---|---|---|
| 6,771,779 B1* | 8/2004 | Eriksson | ................. | H04M 3/56 |
| | | | | 379/202.01 |
| 7,839,758 B1* | 11/2010 | Gregorian | ................ | H04B 3/23 |
| | | | | 370/201 |
| 2009/0016542 A1* | 1/2009 | Goldstein | .............. | H04R 3/005 |
| | | | | 381/57 |
| 2009/0164212 A1* | 6/2009 | Chan | ................... | G10L 21/0208 |
| | | | | 704/226 |
| 2009/0248411 A1* | 10/2009 | Konchitsky | ............. | G10L 15/20 |
| | | | | 704/242 |
| 2011/0110526 A1* | 5/2011 | Ishibashi | ............... | H04M 9/082 |
| | | | | 381/66 |
| 2014/0126745 A1* | 5/2014 | Dickins | .................. | H04R 3/002 |
| | | | | 381/94.3 |
| 2014/0254816 A1* | 9/2014 | Kim | ....................... | G10K 11/16 |
| | | | | 381/71.11 |
| 2014/0376744 A1* | 12/2014 | Hetherington | ........... | H03G 3/20 |
| | | | | 381/94.2 |
| 2015/0221322 A1* | 8/2015 | Iyengar | ................... | G10L 25/84 |
| | | | | 704/226 |
| 2015/0332704 A1* | 11/2015 | Sun | ....................... | H04M 9/082 |
| | | | | 704/227 |

(Continued)

*Primary Examiner* — Lisa Hashem
(74) *Attorney, Agent, or Firm* — The Law Office of Joseph L. Felber (57) ABSTRACT

The present invention is suitable for use in call centers and in other environments that include multiple service representatives, in which the voice of one representative may be picked up by the telephone of another representative in the surrounding vicinity. Disclosed herein are various methods of and systems for receiving multiple audio streams from multiple microphones, finding the correlations between the multiple audio streams, and using the correlations to attenuate the ambient noise from each audio stream. Accordingly, a caller in a conversation with a service representative hears the representative's voice with much of the ambient noise removed.

18 Claims, 6 Drawing Sheets

(56) References Cited

U.S. PATENT DOCUMENTS

| | | | |
|---|---|---|---|
| 2016/0035366 A1* | 2/2016 | Matsuo | G10L 21/02 |
| | | | 381/66 |
| 2017/0244285 A1* | 8/2017 | Raj | H02J 50/12 |
| 2017/0345444 A1* | 11/2017 | Tokuda | G10L 21/0364 |
| 2018/0048768 A1* | 2/2018 | Spittle | H04M 9/082 |
| 2019/0124206 A1* | 4/2019 | Qiao | H04M 9/082 |
| 2019/0267018 A1* | 8/2019 | Birchall | G10L 21/0208 |

* cited by examiner

NOISE REMOVAL IN CALL CENTERS

RELATED APPLICATIONS

This application claims the benefit under 35 U.S.C. § 119(e) of U.S. Provisional Application No. 62/464,395, filed Feb. 28, 2017, which is hereby incorporated by reference in its entirety.

FIELD OF THE INVENTION

This invention relates generally to the way that noise reduction can be performed in call centers by utilizing the multiple microphones that already exist there. This invention is embodied as various methods of receiving multiple audio streams from multiple microphones, finding the correlation between the multiple audio streams and attenuating the ambient noise from each audio stream.

BACKGROUND OF THE INVENTION

Call centers are crowded locations in which agents sit next to each other making phone calls to customers. As a result, these phone calls contain much ambient noise that is caused due to the physical conditions that exist in the call centers.

Call centers highly appreciate customer satisfaction as one of the key factors of the quality of their service. One of the parameters that influence customer satisfaction is the sound quality of the phone call. For example, if during the call the customer, in addition to hearing the agent with whomever he/she is talking, also hears other agents talking with their customers, such would be considered unprofessional and in some cases even reveal private data of the other customers. As another example, during a call, a customer suddenly hears the supervisor of the call center announcing a message or speaking loudly with agents. This ambient noise in the phone calls impacts the overall satisfaction of the customer.

In addition, this ambient noise can expose private user data. For example, during a call with an agent the customer overhears another agent talking to another customer and verifying his/her credit card number. As a result, the credit card information is now heard by a person who was not supposed to hear it.

Call centers are not indifferent to this problem and try to reduce its severity in multiple ways. One way is by enforcing a code of behavior instructing all people in the call center to keep their voices down and to avoid making loud noises. Another way to reduce the ambient noise is to physically increase the isolation between agents, for example, by increasing the distance between the agents and/or building separating structures between them. Another way to reduce the ambient noise is to purchase, for each agent, expensive headsets that have noise reduction capabilities. Overall, all the above methods help reduce the ambient noise, but they cannot always be used and, even when they are used, they do not solve the problem that still remains a major concern to call center management.

SUMMARY OF THE INVENTION

An aspect of an embodiment of the invention relates to a system and method of receiving multiple audio streams in real-time, finding a correlation between the audio streams, using this correlation to remove ambient noise from the audio streams, and forwarding clean audio streams to their destination.

An aspect of an embodiment of the invention relates to a reference-based centralized noise reduction system in call centers that is connected, directly or indirectly, to the microphones that already exist in call centers in order to identify the legitimate (desired) voices and the ambient noises in each call. This identification can be done, for example, by correlating audio streams of agents that are sitting close to each other and therefore the voice of each one of them can become ambient noise in the calls made by the other agent.

The invention may be embodied as a method of processing audio streams to reduce noise. The steps of the method include: receiving a first aggregated signal from a first microphone, the first aggregated signal including a first primary signal and one or more first ambient signals; receiving a second aggregated signal from a second microphone, the second aggregated signal including a second primary signal and one or more second ambient signals, at least one of the first ambient signals being a function of at least the second primary signal, and at least one of the second ambient signals being a function of at least the first primary signal; determining a correlation between the first and second aggregated signals; attenuating the first ambient signals based on the correlation; and producing a first output signal including the first primary signal and the attenuated first ambient signals.

The invention may also be embodied as a noise reduction system having an audio input interface unit, a central processing unit (CPU), and an audio output interface unit. The audio input interface unit is operative to receive: a first aggregated signal from a first microphone, the first aggregated signal including a first primary signal and one or more first ambient signals; and a second aggregated signal from a second microphone, the second aggregated signal including a second primary signal and one or more second ambient signals, at least one of the first ambient signals being a function of at least the second primary signal, and at least one of the second ambient signals being a function of at least the first primary signal. The CPU is operative to determine a correlation between the first and second aggregated signals, to attenuate the first ambient signals based on the correlation; and to produce a first output signal including the first primary signal and the attenuated first ambient signals. The audio output interface unit is operative to transmit the first output signal.

BRIEF DESCRIPTION OF THE DRAWINGS

The present invention will be understood and appreciated more fully from the following detailed description of embodiments taken in conjunction with drawings. Identical structures, elements or parts, which appear in more than one figure, are generally labeled with the same or similar number in all the figures in which they appear, wherein.

DETAILED DESCRIPTION

Figure 1:
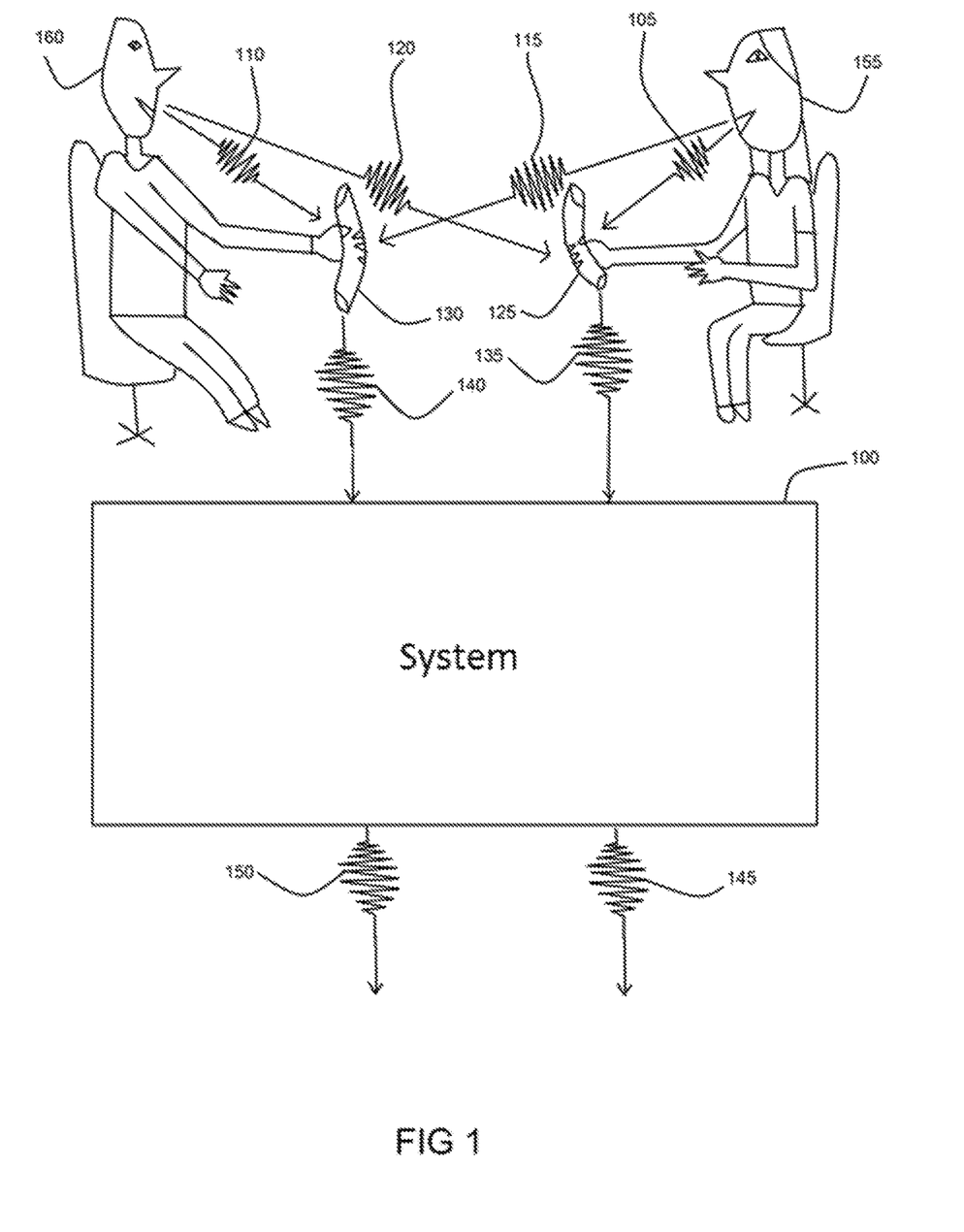
FIG. 1 is a schematic illustration of implementation of a reference-based noise reduction system, with two agents according to an exemplary embodiment of the invention.

FIG. 1 is a schematic illustration of implementation of a reference-based noise reduction system in a call center with two agents according to an exemplary embodiment of the invention. In an exemplary embodiment of the invention, two agents sitting close to each other, agent 160 and agent 155 conduct conversations with customers over telephones 130 and 125 respectively. The voice of agent 160 produces audio signals 110 and 120 comprising speech. Audio signal 110 is received by telephone 130. The voice of agent 155 produces audio signals 105 and 115 comprising speech. Audio signal 105 is received by telephone 125. Telephone 130 also picks noisy audio signal 115 which is the voice of agent 155. The aggregated signal 140, which contains both audio signal 110 (the primary signal) and audio signal 115 (the ambient signal), is transmitted to System 100. Telephone 125 also picks noisy audio signal 120 which is the voice of agent 160. The aggregated signal 135, which contains both audio signal 105 (the primary signal) and audio signal 120 (the ambient signal), is transmitted to System 100.

In an exemplary embodiment of the invention, System 100 receives audio signals 140 and 135. System 100 then calculates the best correlation from audio signal 135 to audio signal 140.

Building correlations between two audio signals is based on known practice in the art of audio processing. Such correlations have many practical usages, such as echo cancellation and handling reverberation. Unlike the prior art, though, embodiments of the present invention remove noise that is not echo, such as nearby conversations on other telephones. The conversations may be received from microphones in which their locations are not known in advance, nor are their particular acoustic properties known in advance. Some embodiments work even when confronted with unknown or unstable network delays.

Once the correlation from audio signal 135 to audio signal 140 is identified, System 100 attenuates audio signal 115 from audio signal 140 and transmits a cleaner audio signal 150. Attenuating noise from a primary audio stream 140, using a secondary audio stream 135, which is also referred to as a reference audio stream, is a known practice in the art of audio processing.

System 100 also calculates the best correlation from 140 to 135 and then system 100 attenuates audio signal 120 from audio signal 135 and transmit a clean audio signal 145.

In an exemplary embodiment of the invention, System 100 uses audio stream 135 as a reference signal to clean primary audio stream 140 and also uses audio stream 140 as a reference signal to clean primary audio stream 135.

System 100 needs to be able to build a correlation and to remove or attenuate noise even when the reference audio stream contains the voice of the primary speaker that should not be attenuated. In order to do so, in an exemplary embodiment of the invention, system 100 can utilize different techniques to enhance the correlation between the audio streams. One technique can be by using the volume in which, for example, system 100 may assume that the volume of agent 155 will be louder in audio stream 135 than in audio stream 140. Another technique can be cross correlation in which, for example, system 100 will look in parallel for the voices of both agents 155 and 160 in both audio streams 135 and 140. Once cross-correlation is identified, system 100 can use this information to calculate the gain factors between the two audio streams. Another technique utilizes the timing difference between the primary signal and the reference signal to identify the two sources of voices.

Figure 2:
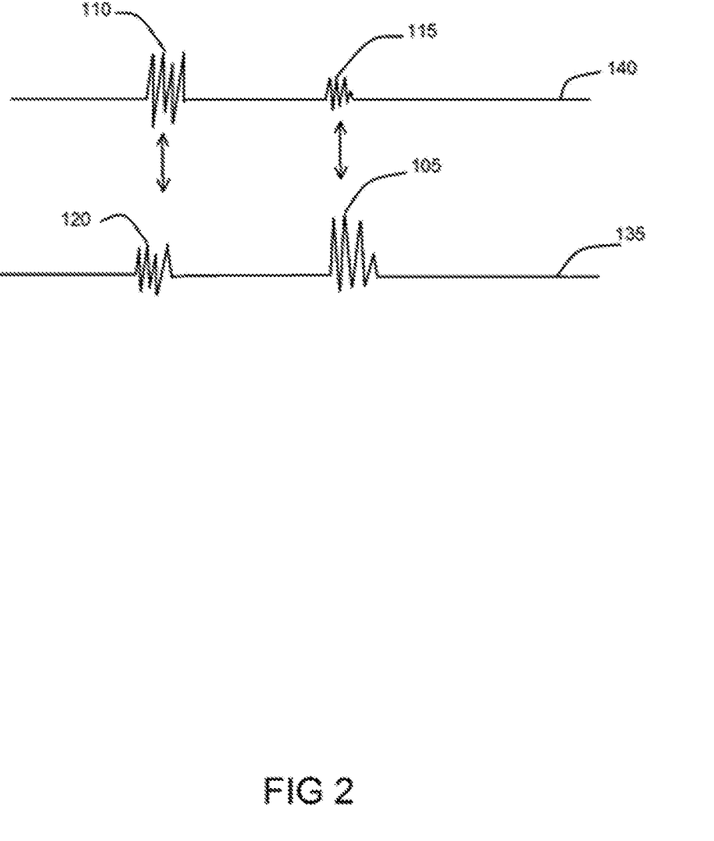
FIG. 2 is a schematic illustration of two waveforms.

FIG. 2. is a schematic illustration of waveforms 140 and 135. Waveform 140 contains both audio signal 110 and audio signal 115. Similarly waveform 135 contains both audio signal 120 and audio signal 105. Audio signals 110 and 120 have similar acoustics, because they are from the same voice, that of agent 160. Similarly audio signals 115 and 105 have similar acoustic, because they are both from the same voice, that of agent 155. In exemplary embodiment of the invention, signal 110 is stronger than signal 115 and signal 105 is stronger than 120. System 100 can determine the transformation function between signals 110 and 120 and the transformation function between 115 and 105. Using these transformation functions, system 100 can cancel signal 115 from 140 and cancel signal 120 from 135. These transformations may be represented by $T_1 \cdot S_{110} = S_{120}$, $T_2 \cdot S_{120} = S_{110}$, $T_3 \cdot S_{115} = S_{105}$, and $T_4 \cdot S_{105} = S_{115}$, where $T_1$, $T_2$, $T_3$, and $T_4$ are the transformation functions from $S_{110}$ to $S_{120}$, $S_{120}$ to $S_{110}$, $S_{115}$ to $S_{105}$ and $S_{105}$ to $S_{115}$, respectively.

In an exemplary embodiment of the invention, phone 125 can send audio stream to system 100 even when agent 155 is engaged in a call. This behavior enables system 100 to constantly receive reference signal 135 and to thereby clean audio stream 140 from any noise originated from agent 155 or its vicinity. For example, system 100 can clean audio stream 140 from noises agent 155 is making when organizing her desk or chatting with a colleague. System 100 can also be notified whenever agent 155 is during a call. Whenever agent 155 is not during a call, system 100 can stop cleaning audio stream 135 or stop transmitting signal 145.

In an exemplary embodiment of the invention, the continuity of transmitting audio signals to system 100, regardless the existence of phone calls, enables system 100 to build robust correlation and minimize the need to re-converge every time audio signal is being restarted.

In an exemplary embodiment of the invention, whenever a reference audio signal starts transmitting to system 100, the last convergence details for this reference audio signal will be provided to system 100 in order to reduce the time to reach a new convergence.

In an exemplary embodiment of the invention, the operation of system 100 includes a learning phase to calibrate the audio levels that are received from different microphones and telephones. This can be a one time learning phase or a continuous learning that keeps improving over time.

Figure 3:
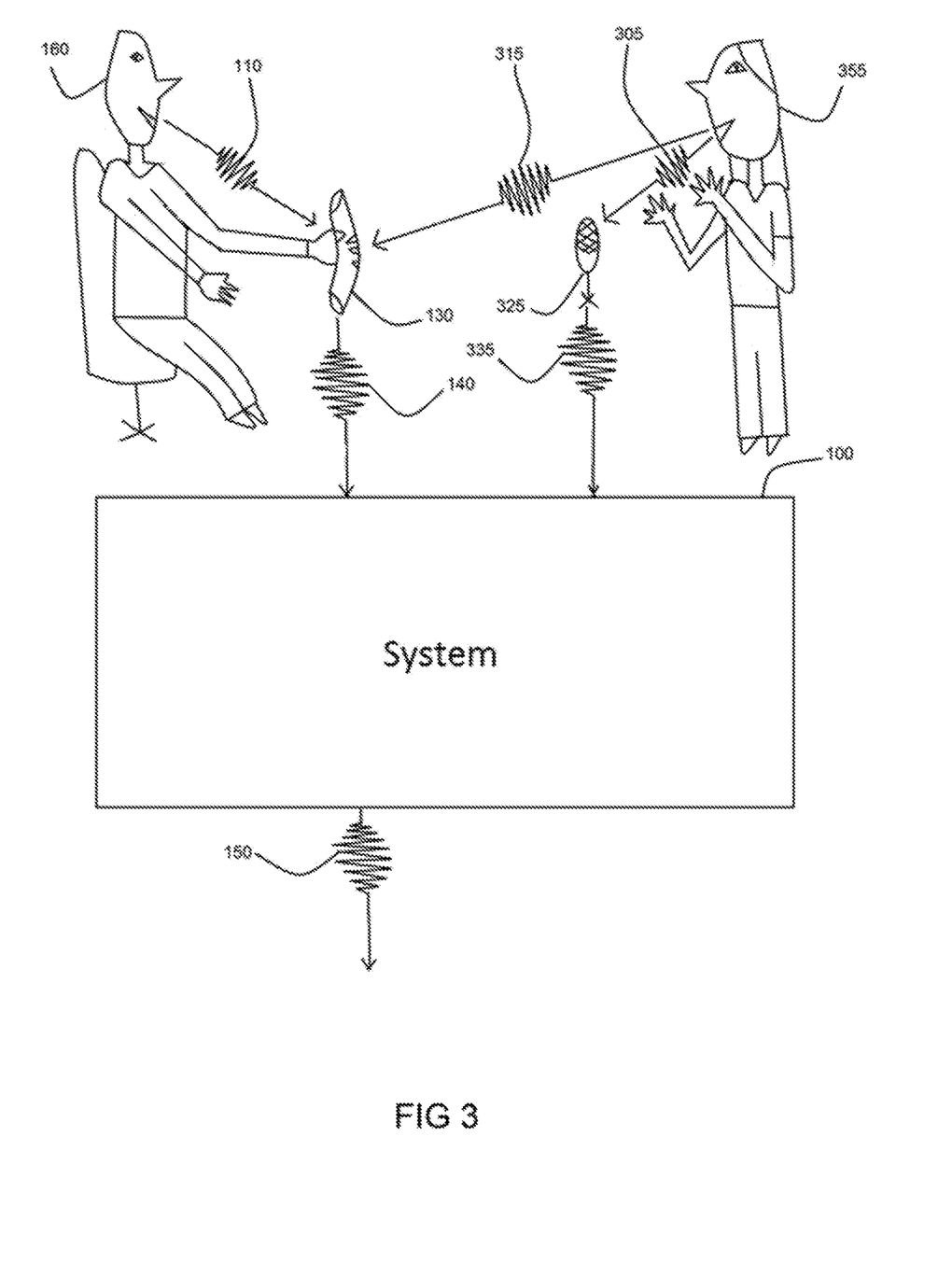
FIG. 3 is a schematic illustration of implementation of a reference-based noise reduction system, with one agent and one supervisor according to an exemplary embodiment of the invention.

FIG. 3 is a schematic illustration of implementation of a reference-based noise reduction system in a call center with one agent and one supervisor according to an exemplary embodiment of the invention. In this embodiment, agent 160 conducts conversations with customers with telephone 130. In the distance, a supervisor 355 is calling instructions to all agents. Agent 160 produces an audio signal 110 comprising speech, which is received by telephone 130. Supervisor 355 produces audio signals 305 and 315 comprising speech. Audio signal 305 is received by a reference microphone 325, which need not be a part of a telephone. Telephone 130 will also pick noisy audio signal 315, which includes the loud talking of supervisor 355. The aggregated signal 140, which contains both 110 and 315, is transmitted to System 100. The reference audio signal 335 which contains 305 is transmitted to System 100.

In this embodiment, System 100 receives primary audio signal 140 and reference audio signal 335. System 100 then calculates the best correlation from 335 to 140. Once correlation is identified, System 100 cancels audio signal 315 from audio signal 140 and transmits a clean audio signal 150.

In an exemplary embodiment of the invention, microphone 325 may also capture the voice of multiple supervisors, other agent, and/or any other ambient noise.

In an exemplary embodiment of the invention, microphone 325 may also capture the voice of the agent 160.

Figure 4:
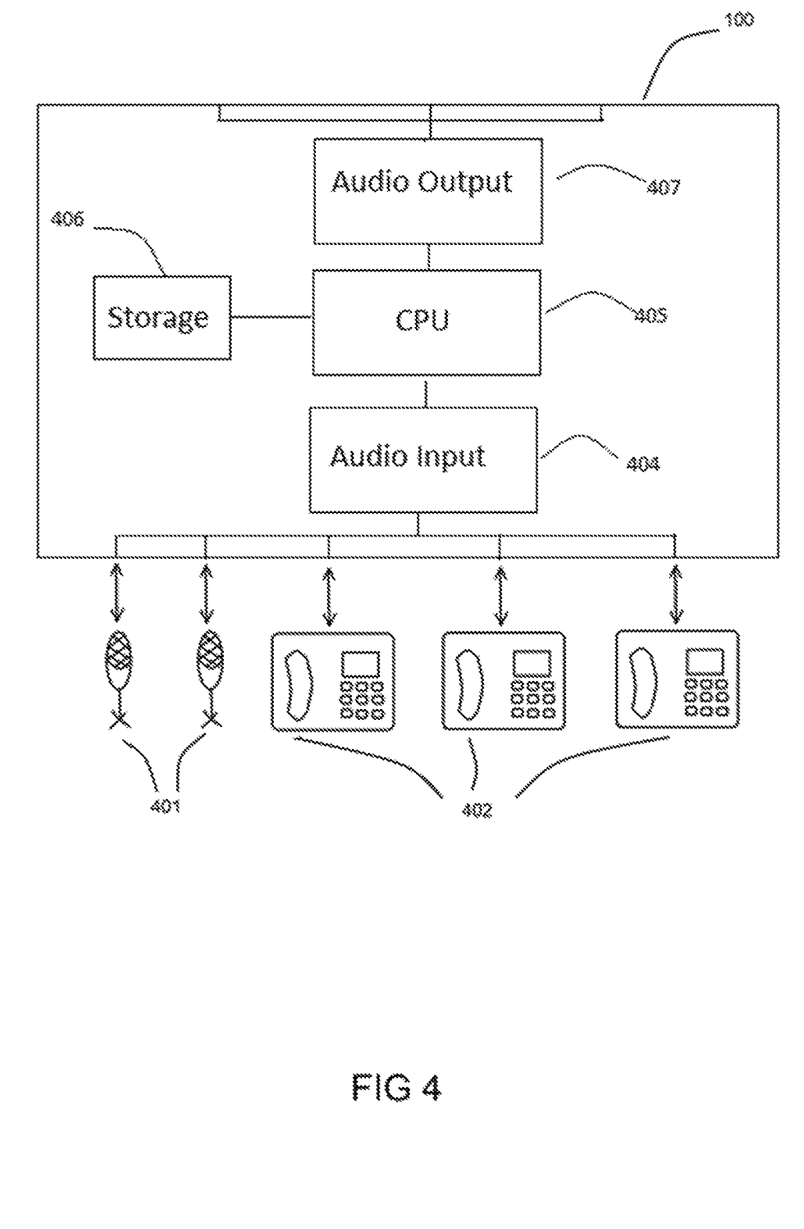
FIG. 4 is a schematic illustration of directly connecting audio devices to the noise reduction system.

FIG. 4 is a schematic illustration of how the phones and microphones are connected to system 100 according to an exemplary embodiment of the invention. System 100 is directly connected to the phones 402 using standard protocols. For example, system 100 can serve as a SIP Proxy to the phones 402. System 100 also is directly connected to the microphones 401. The interface for the phone 402 and microphone 401 inputs is audio input interface unit 404. When connected to the phones and microphones, system 100 can receive the multiple audio streams. System 100 can also be connected to phones 402 and microphones 401 using dedicated control software. Audio input interface unit 404 is connected to a central processing unit (CPU) 405, which executes software stored in storage 406. Alternate embodiments may use firmware, hardware, or any combination with or without software to instruct the CPU to reduce the noise from the audio signals of phones 402 and microphones 401. The CPU 405 then sends the cleaned audio signals to audio output interface unit 407 for transmission to their destinations. The components that system 100 uses for the CPU 405, storage 406, audio input interface unit 404, and audio output interface unit 407 may be conventional components selected by one skilled in the art according to given design requirements.

Figure 5:
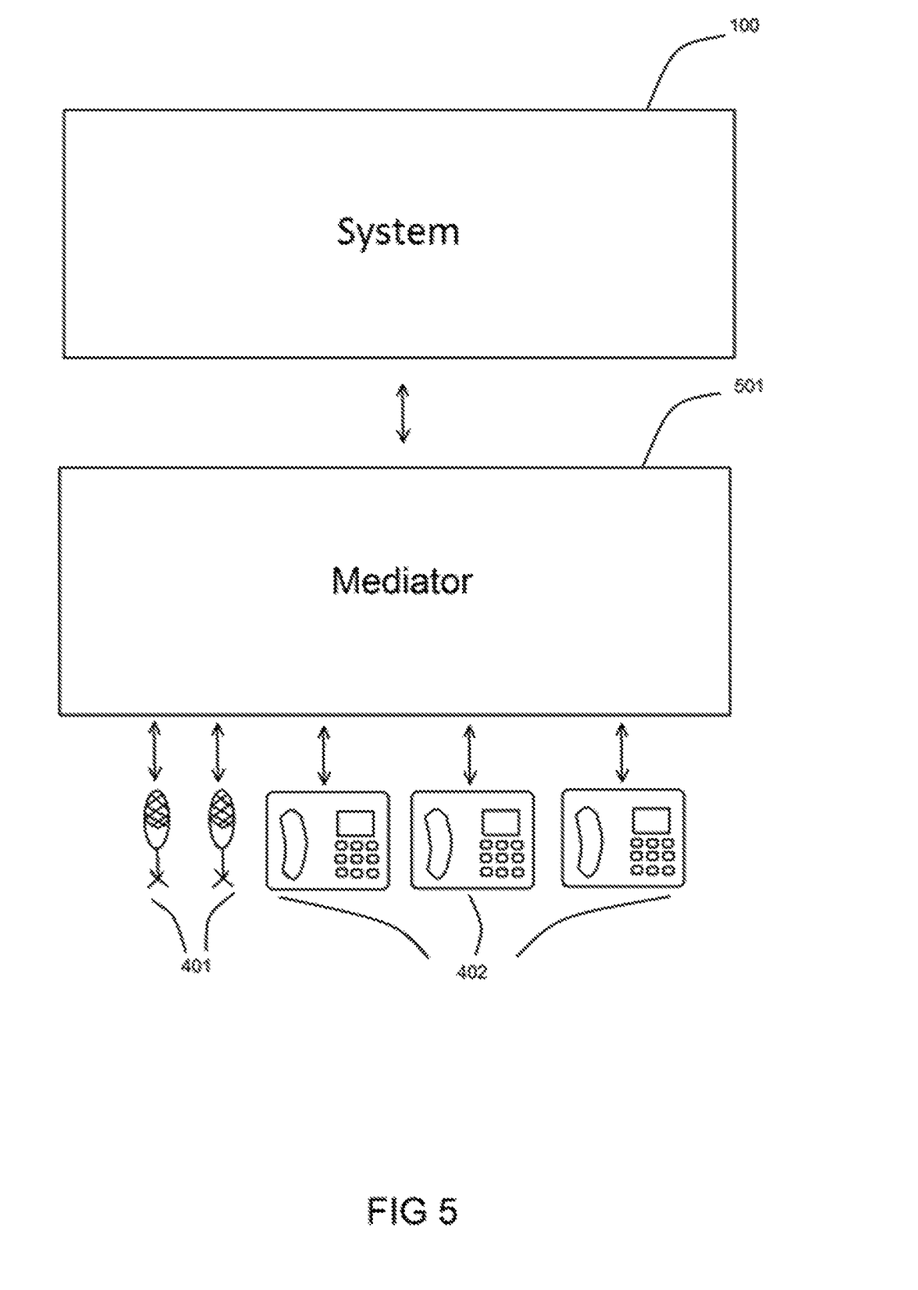
FIG. 5 is a schematic illustration of indirect connection of audio devices to the noise reduction system.

FIG. 5 is a schematic illustration of how the phones and microphones are connected to system 100 according to an exemplary embodiment of the invention. System 100 can be connected to a mediator device 501 which is connected to the phones 402 and microphones 401. Many types of mediators can be used like PBX (private branch exchange) or Media Gateway. System 100 can be connected to the mediator in many modes like Sip Trunk or router.

Figure 6:
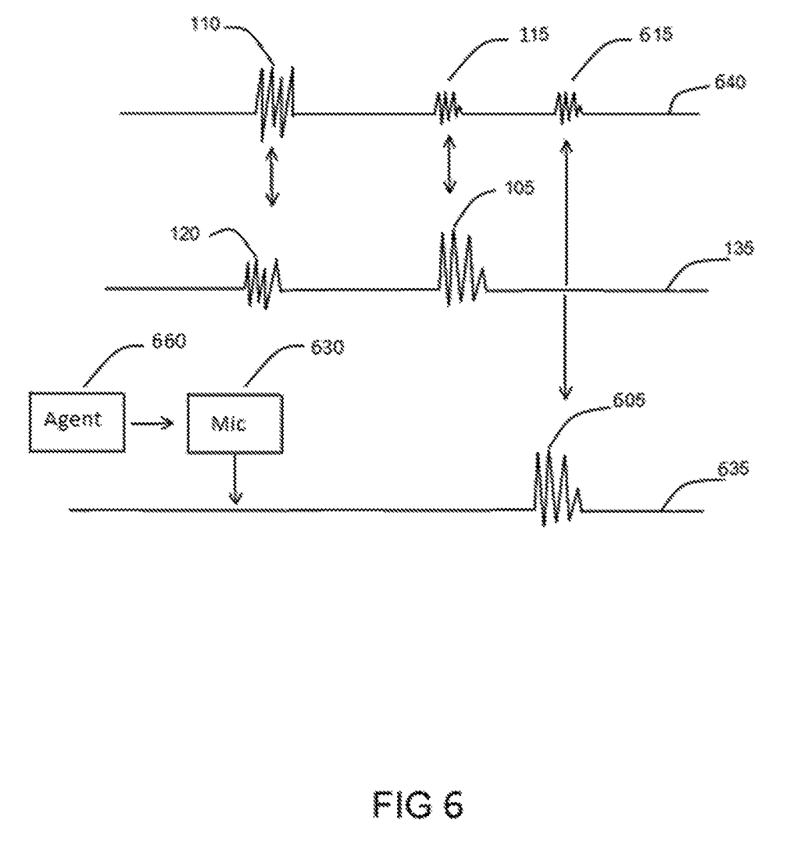
FIG. 6 is a schematic illustration of three waveforms according to another embodiment of the invention.

FIG. 6. is a schematic illustration of three waveforms 640, 135 and 635. Waveform 635 is the audio capture by microphone 630 of agent 660. Waveform 635 contains signal 605 (a primary signal), which is the voice of agent 660. (Waveform 635 may be aggregated, that is, may also have ambient signals as components, but their illustration in FIG. 6 is omitted for clarity.) Waveform 640 (an aggregated signal) contains audio signal 110 (the primary signal), audio signal 115 (an ambient signal), and audio signal 615 (another ambient signal). Audio signal 615 is the voice of agent 660 as it was captured by the microphone 130 of agent 160.

Audio signals 605 and 615 have similar acoustic since they are both the same voice of agent 660. System 100 can use both reference signals 135 and 635 in order to attenuate noises 115 and 615 from signal 640.

Although one usage for system 100 is in call centers, in an exemplary embodiment of the invention, system 100 can be used in other types of organizations. For example system 100 can be used to clean phone calls in an open office while receiving audio streams from multiple microphones in the office. In another example, system 100 can be used in office to remove ambient noises originating from a noisy street outside of the office. In this case, one of the reference audio streams to system 100 can be from a microphone placed near the window or outside the office. Another example can be in a factory that uses system 100 to clean intercom calls from the noise generated by nearby machinery. Another example can be a railway station that uses system 100 to clean phone calls of the passengers from the announcements that are played over the PA system. In this case one of the reference audio streams to system 100 can be placed near a PA loud speaker. Another example can be two people sitting next to each other and each one of them is in a conversation on his mobile phone. The voice of each person is considered background noise to the call of the other person. System 100 can be used to remove this background noise. In case of mobile phones, the indication that the two people are talking close to each and therefore probably disturbing each other can be identified by the locations services like GPS, mobile operator data etc. Another example can be a railroad car/train wagon that is full of people talking on their mobile phones and therefore disturbing each other.

In an exemplary embodiment of the invention, system 100 can receive as input audio streams from multiple types of microphones. For example, system 100 can receive audio streams from phones, or stand-alone microphones. System 100 can also receive audio streams from intercom devices or cameras with build-in microphone.

In an exemplary embodiment of the invention, system 100 can use several audio streams to clean a single audio stream. For example, if agents A, B and C are sitting next to each other, system 100 can clean the primary audio stream of agent A by correlating it with both reference audio stream of agent B and reference audio stream of agent C. System 100 can constantly use both references to do the cleaning or it can take the reference that is most disturbing at any given point in time. Alternatively system 100 can use either reference when its disturbance level increases beyond a pre-specified threshold during a call.

In an exemplary embodiment of the invention, system 100 can be used to remove any noise picked up by reference microphones. It can be, for example, a supervisor talking loudly, an agent chatting with friends, and/or noise from a coffee/refreshment corner.

In an exemplary embodiment of the invention, system 100 can accept as input additional non-audio information to help it efficiently build correlations between the audio streams. For example, system 100 can accept as input fifty different audio streams and in addition it can accept the distances between the fifty different microphones or their location. Another example can be that system 100 receives, for each primary audio stream that should be cleaned, an indication of which reference audio stream(s) may contain noise that should be correlated and removed, for example, streams of nearby agents and a loud supervisor, so system 100 does not need to process all fifty streams each time to clean a single audio stream. As another example, the identity of the reference signals for each primary audio stream may be time dependent, for example, based on the scheduling of the agents in the call centers.

In an exemplary embodiment of the invention, system 100 can use a pre-specified reference, that is, system 100 can statically decide which reference audio streams to use when building the correlation for a specific primary audio stream. Alternatively, system 100 can determine what to use as a reference based at least in part on recent data, that is, system 100 can dynamically use the top few reference audio streams that contain the most disturbing noise at any given point in time.

In an exemplary embodiment of the invention, system 100 can take into account delays and timing information to synchronize between the multiple audio streams that it receives. For example system 100 can take into account network delays and timing information of each audio stream that is arriving to system 100 in order to better synchronize the multiple audio streams that it receives and as a result to improve the calculated correlation between the audio streams. System 100 can also use timing information that is built-in standard VoIP network protocols like the Real-time Transport Protocol (RTP).

In an exemplary embodiment of the invention, system 100 can add a short delay to the primary audio steam that is to be cleaned. This can help system 100 to increase the accuracy of the correlation and the results of the noise removal. For example, when receiving audio steam of agent A, system 100 can copy it. The first copy will be the primary one that will be cleaned and a delay can be added to it. The other copies (one or more) will be used as reference to clean other primary audio streams, such as that of agent B.

In an exemplary embodiment of the invention, the operation of system 100 includes a learning phase to calibrate the audio levels that are received from different microphones and telephones. The learning of the audio levels enables system 100 to normalize the acoustic behavior of each telephone and microphone. System 100 can use the learned data to improve the correlation. In addition, the learned data enables system 100 to focus only on the most disturbing noises. The learned data can be learned at one time, or it can be learned continuously so that the data improves over time. Alternatively, the data for calibration may be provided to the system by an outside source, so there would be no learning phase.

In an exemplary embodiment of the invention, to aid an administrator of system 100 in diagnosing problems and determining fixes, system 100 can measure the levels of detected noise, including the immediate noise levels and average noise levels. System 100 can report this information in real-time and can record this information for later usage. System 100 can also request the immediate intervention of a system administrator in case noise level exceeds a pre-defined threshold.

Embodiments described above exemplify system 100 used in real-time. That is, the output signals are produced as the aggregated signals are received from the microphones. However, although one exemplary use of system 100 is for real-time improvement of audio quality, system 100 may also be used to clean recorded files, such as by off-line or batch processing. For example, system 100 can receive recorded files of multiple phone calls in a call center during a certain time period, determine the correlations and remove the noises from the recorded files. For each recorded file, system 100 may also receive an identity and a time stamp. In addition, system 100 can receive the identity of the reference calls that should be used to clean each primary call. There are many practical uses for clean recorded files like: improving the results of the analytic process, increasing the compression rate of the saved audio files, storing high quality clean audio, etc.

In an exemplary embodiment of the invention, system 100 can run on multiple locations. For example it can be installed on the premises of the voice and noise sources it processes, or it can be an SAS service in the cloud. System 100 may also be distributed over multiple physical locations.

In an exemplary embodiment of the invention, system 100 can operate to process notifications of portions of calls that contain sensitive or private data, such as credit card information. In response to the notification, System 100 ensures that this sensitive or private information does not become or remain part ambient noise in other calls.

In an exemplary embodiment of the invention, not all audio streams that are provided as input to System 100 have good correlation between them. For example, audio streams that belong to agents that are sitting far away from each other might not have any significant audio in common and therefore will not have any noticeable correlation between them. Another example can be, if two agents are sitting not far away from each other, the first agent is shouting while the second agent is talking quietly. In this scenario it is possible that the voice of the first agent will be picked up by the microphone of the second agent but the voice of the second agent will not be picked up significantly by the microphone of the first agent. In such case, when system 100 calculates the correlations it will find that the voice of the first agent can be correlated to the aggregated second signal. On the other hand, however, the voice of the second agent cannot be significantly correlated to the first aggregated signal. In the latter case, when the quality of the correlation is below a set threshold, system 100 will declare that no meaningful correlation was detected and will not use this correlation for noise attenuation. In other words, because the correlation is below the set threshold, there is no attenuation performed. The threshold level for making this kind of decision can be pre-defined or may be updated during run-time.

In an exemplary embodiment of the invention, the different sensitivity level of two microphones can cause the voice of the first agent to be picked up by the microphone of the second agent but the voice of the second agent will not be picked up by the microphone of the first agent.

In an exemplary embodiment of the invention, system 100 can reduce the processing power it requires. Instead of using all possible references, system 100 can use the most influential reference signals for each primary signal. Every time system 100 looks for a correlation between a primary signal and a reference signal, it calculates a score that indicates the quality of the correlation. For each primary microphone, system 100 sorts all possible reference microphones based on the correlation score of their respective signals. When system 100 receives a primary signal captured by a primary microphone, it uses only the reference signals that were captured by the microphones having high correlation scores with the primary microphone. That is, system 100 attenuates an ambient signal based on particular correlations such that the correlations' score exceed a pre-set threshold.

In an exemplary embodiment of the invention, even if system 100 does not use all possible reference signals all the time, it might still maintain the ability to detect new influencing reference signals. For example, it can still be able to detect a reference microphone that is placed near the primary one or a reference microphone that is currently being used for to detect a supervisor speaking loudly and is also detected by the primary microphone. In order to do so, system 100 from time to time selects references that do not necessarily have high scores and tests their current correlation scores. This method enables system 100 to find out whether there are changes in the microphone spatial distribution or changes in the microphone usage and detects references that now have good correlation with the primary microphone and should get high scores.

In another exemplary embodiment of the invention, system 100 detects whether a phone is not active for some time and, if so, temporarily stops using it as a reference. These cases might happen if, for example, an agent takes a break or finishes the daily shift.

The multiple audio streams that are sent to system 100 as input may have different sampling rates. For example, few audio streams may use 8,000 kHz while others may use 16,000 kHz. System 100 can normalize the multiple audio streams to a unified sampling rate in order to simplify the correlation and attenuation process. The output of system 100 can still maintain the original sampling rate.

In another exemplary embodiment of the invention, additional microphones might be added to the call center in order to provide to system 100 additional reference signals and thus to improve the noise reduction done by system 100. For example, if the supervisor in a call center speaks loudly while not conducting a phone call, a dedicated microphone can be added near the supervisor. This dedicated microphone can be configured to constantly steam audio signal to system 100 and therefore provide a constant reference signal that enables system 100 to remove the supervisor's voice from the calls of the agents. Data from such dedicated microphone can, for example, be placed in an audio stream of a "dummy" phone call in order to generate the reference audio signal to system 100. Another example use for such dedicated microphone is placement near a refreshment area (vicinity of water-cooler, coffee-machine, vending machine, . . . ) in order to capture the noise that is made where people congregate for conversation during work breaks.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

What is claimed is:

1. A method of processing audio streams originating from separate conversations to reduce noise, the method comprising:
   receiving a first aggregated signal from a first microphone, the first aggregated signal including a first primary signal and one or more first ambient signals;
   receiving a second aggregated signal from a second microphone, the second aggregated signal including a second primary signal and one or more second ambient signals, at least one of the first ambient signals being a function of at least the second primary signal, and at least one of the second ambient signals being a function of at least the first primary signal;
   determining a correlation between the first and second aggregated signals;
   attenuating the first ambient signals based on the correlation; and
   producing a first output signal including the first primary signal and the attenuated first ambient signals without attenuating the first primary signal;
   wherein:
     the first microphone is positioned closer to a first person than to a second person;
     the second microphone is positioned closer to the second person than to the first person;
     the first primary signal and the second ambient signal include speech from the first person; and
     the second primary signal and the first ambient signal include speech from the second person;
     the first person executes a conversation with a first party; and
     the second person executes a conversation, separate from the conversation the first person executes, with a second party.

2. The method of claim 1 further comprising:
   receiving a third aggregated signal from a third microphone, the third aggregated signal including at least a third primary signal, at least one of the first ambient signals being a function also of the third primary signal;
   determining a correlation between the first and third aggregated signals;
   determining a correlation between the second and third aggregated signals;
   attenuating the first ambient signal based additionally on the correlation between the first and third aggregated signals;
   attenuating the second ambient signal based on the correlation between the first and second aggregated signals and not based in part on the correlation between the second and third aggregated signals;
   producing a second output signal including the second primary signal and the second ambient signals that have been attenuated.

3. The method of claim 1, wherein the correlating includes:
   identifying a first transformation function between the first primary signal and the second ambient signal;
   identifying a second transformation function between the second primary signal and the first ambient signal; and
   wherein the attenuating includes applying the first and second transformation functions to reduce the noise.

4. The method of claim 1, wherein the correlating includes:
   determining a first timing difference between the first primary signal and the second ambient signal;
   determining a second timing difference between the second primary signal and the first ambient signal; and
   wherein the attenuating includes utilizing the first and second timing differences to reduce the noise.

5. The method of claim 1, wherein the first output signal is produced in real time.

6. The method of claim 1, wherein the first output signal is produced from recordings of the first and second aggregated signals.

7. The method of claim 1 further comprising:
   receiving a third aggregated signal from a third microphone, the third aggregated signal including at least a third primary signal and one or more third ambient signals;
   determining a correlation between the first and third aggregated signals;
   determining a correlation between the second and third aggregated signals;
   for each of the three correlations, calculating a score that indicates a quality of the correlation; and
   attenuating an ambient signal based on a particular correlation if the correlation's score exceeds a pre-set threshold.

8. The method of claim 1 further comprising:
   calibrating audio levels of the aggregated signals received from the first and second microphones.

9. The method of claim 1 further comprising:
   adding a delay to the first aggregated signal before attenuating the first ambient signals.

10. The method of claim 1 further comprising:
    measuring levels of noise in the aggregated signals for reporting.

11. The method of claim 10 further comprising:
    reporting the measured levels of noise to a system administrator for intervention if a noise level exceed a predefined threshold.

12. The method of claim 10 further comprising:
recording the measured levels of noise.

13. The method of claim 1, the method further comprising:
receiving an audio signal from a third microphone, the third microphone not being an element of a telephone;
wherein the first microphone is an element of a first telephone and the second microphone is an element of a second telephone.

14. A noise reduction system for audio streams originating from separate conversations, the system comprising:
an audio input interface unit operative to receive:
a first aggregated signal from a first microphone, the first aggregated signal including a first primary signal and one or more first ambient signals; and
a second aggregated signal from a second microphone, the second aggregated signal including a second primary signal and one or more second ambient signals, at least one of the first ambient signals being a function of at least the second primary signal, and at least one of the second ambient signals being a function of at least the first primary signal;
a CPU operative to determine a correlation between the first and second aggregated signals, to attenuate the first ambient signals based on the correlation; and to produce a first output signal including the first primary signal and the attenuated first ambient signals without attenuating the first primary signal; and
an audio output interface unit operative to transmit the first output signal;
wherein:
the first microphone is positioned closer to a first person than to a second person;
the second microphone is positioned closer to the second person than to the first person;
the first primary signal and the second ambient signal include speech from the first person; and
the second primary signal and the first ambient signal include speech from the second person;
the first person executes a conversation with a first party; and
the second person executes a conversation, separate from the conversation the first person executes, with a second party.

15. The noise reduction system of claim 14,
wherein the audio input interface unit is also operative to receive a third aggregated signal from a third microphone, the third aggregated signal including at least a third primary signal, at least one of the first ambient signals being a function also of the third primary signal; and
wherein the CPU is also operative to determine a correlation between the first and third aggregated signals, to determine a correlation between the second and third aggregated signals, to attenuate the first ambient signal based additionally on the correlation between the first and third aggregated signals; to attenuate the second ambient signal based on the correlation between the first and second aggregated signals and not based in part on the correlation between the second and third aggregated signals; to produce a second output signal including the second primary signal and the second ambient signals that have been attenuated, and to transmit the second output signal through the output interface.

16. A call center comprising:
the noise reduction system of claim 15;
a first telephone including the first microphone; and
the third microphone.

17. The noise reduction system of claim 14,
wherein the audio input interface unit is also operative to receive an audio signal from a third microphone, the third microphone not being an element of a telephone; and
wherein the first microphone is an element of a first telephone and the second microphone is an element of a second telephone.

18. A call center comprising:
the noise reduction system of claim 14;
a first telephone including the first microphone; and
a second telephone including the second microphone.

* * * * *